United States Patent [19]

Blanpain et al.

[11] 4,137,446
[45] Jan. 30, 1979

[54] WELDING WIRE CONSTITUTED BY A CORE OF WELDING POWDER ENCLOSED BY A MANTLE OF METAL AND A METHOD OF PRODUCING THE WELDING WIRE

[75] Inventors: Jacques Blanpain, Gentbrugge; Leon Delehouzee, Wondelgem, both of Belgium

[73] Assignee: Acieries Reunies de Burbach-eich-Dudelange S.S.Arbed, Luxembourg

[21] Appl. No.: 823,460

[22] Filed: Aug. 10, 1977

Related U.S. Application Data

[63] Continuation-in-part of Ser. No. 572,636, Apr. 29, 1975, Pat. No. 4,048,705.

[30] Foreign Application Priority Data

May 22, 1974 [FR] France .............................. 74 17830

[51] Int. Cl.² .................. B23K 35/02; B23K 35/10
[52] U.S. Cl. ................. 219/145.22; 428/558; 29/420; 219/146.31
[58] Field of Search ............ 428/558; 219/146.1, 219/146.52, 146.51, 146.41, 146.3, 146.21, 146.31, 146.32, 146.24, 146.23, 146.22, 146, 145.22; 29/420, 420.5

[56] References Cited

U.S. PATENT DOCUMENTS

| | | | |
|---|---|---|---|
| 1,265,453 | 5/1918 | Jones | 219/146.1 |
| 1,891,546 | 12/1932 | Krembs | 219/146.6 |
| 3,118,053 | 1/1964 | Arikawa et al. | 219/146.3 |
| 3,531,620 | 9/1970 | Arikawa et al. | 219/146.3 |

Primary Examiner—C. W. Lanham
Assistant Examiner—V. K. Rising
Attorney, Agent, or Firm—Michael J. Striker

[57] ABSTRACT

A welding wire constituted by a core of welding powder enclosed by a mantle of metal is produced by forming an upwardly open metal channel composed of an outer channel and an inner channel abutting against the inner surface of the outer channel and having lateral flanks of a height which is about half the height of the lateral flanks of the outer channel, filling the inner channel with the powder, introducing a profiled metal band into the open channel which overlaps the powder in the inner channel and which engages the flanks of the latter at inner faces thereof so that the powder is enclosed by the inner channel and the profiled metal band, and bending upper longitudinal edges of the outer channel into abutment with each other. The longitudinal edges of the outer channel may be subsequently welded to each other, especially if the cross-section of the thus-produced wire is subsequently considerably reduced by passing it through drawing dies or the nip of pressure rolls.

8 Claims, 4 Drawing Figures

4,137,446

WELDING WIRE CONSTITUTED BY A CORE OF WELDING POWDER ENCLOSED BY A MANTLE OF METAL AND A METHOD OF PRODUCING THE WELDING WIRE

CROSS-REFERENCE TO RELATED APPLICATIONS

The present application is a continuation-in-part application of the application Ser. No. 572,636 filed Apr. 29, 1975 now U.S. Pat. No. 4,048,705.

BACKGROUND OF THE INVENTION

The present invention relates to a welding wire, constituted by a core of welding powder enclosed by a mantle of metal, to be used for automatic or semi-automatic welding, with or without a protective gas, as well as to a method of manufacturing such a welding wire.

While the wire throughout the specification and claims is called a welding wire, it is to be understood that this wire may also be used for soldering or hard surfacing.

It is known in the art to use a welding wire which is composed of an outer metallic sheath and a core of powder surrounded by this sheath. The cylindrical or polygonal sheath is usually formed from a band of steel, which may or may not be alloyed, or from another metal which contributes to the welding. The core of the welding wire, which constitutes usually 10 to 50% of the total weight of the wire is composed of a pulverulant mixture usually comprising a plurality of the following components in different combinations in accordance with the work to be performed and in accordance with the conditions prevailing during the welding. Such components may include a slag-forming material of an oxide base and/or carbonates of alkaline earth metal, a flux-forming material of fluoride base and/or alkaline halogenides or alkaline earth metals, deoxidizing and denitrating metals such as Al, Mg. Si, Ti, Mn and different alloys of such metals, one or a plurality of products for stabilization of the welding arc, for example a titanium base of calcium or potassium, a support material of ferric base, of ferro alloys or other metals and alloys to form the desired welding composition. Other mineral and metallic products may be included in the composition of the powder, but since the specific composition of the powder does not form part of the present invention, the above enumeration of such compositions is considered to be sufficient.

A process of fabricating such a welding wire with a core of powder is also known in the art which consists to transform a continuous metallic band into a channel, to introduce the pulverulant mixture in such a channel, to form the channel by one or a plurality of rolling or drawing operations into a tubular member enclosing the powder and to close the metallic member, by forming a weld seam connecting the longitudinal edges, before proceeding with the final drawing operation to impart to the thus-formed welding wire the desired diameter.

This known process to fabrication has considerable drawbacks in that the powder tends to disperse and to stick to the bent borders of the channel during closing of the same and to stick especially to these borders during connecting the borders of the channel by soldering or welding. This will result in a joint of the borders by soldering or welding of such poor quality that the final transformation of the filled tube by drawing is rendered very difficult and the diameter of the thus-formed welding wire can therefore be reduced by drawing only to a small extent.

Various solutions to overcome this drawback are known in the art. A first solution consists to reduce the amount of powder which is fed into the channel. This of course leads to a corresponding increase of the ratio of solid metal to the powder in the welding wire thus obtained. Furthermore, this solution necessarily leads to difficulties in maintaining the homogeneity and uniform distribution of the powder during the fabrication and transformation of the tubular wire. The possibility to use such a welding wire having a disadvantageous ratio of powder to metal and an irregular quality are evidently very limited. Another solution, which likewise only partially solves the above pointed-out problem, consists to submit the powder distributed in the channel to an equalization and compacting prior to closing the tube blank. A further solution, which entails some complications in the technique of preparing the powder and the introduction thereof into the channel, consists to mix the powder with a binder and extrude the thus-formed plastic mass in form of a continuous preformed strand into the channel. This last-mentioned solution is burdensome and does not lend itself to competitive mass fabrication. Thus, all of the above-mentioned solutions have not found an industrial application for manufacturing tubular welding wires with a soldered or welded joint.

In the copending application Ser. No. 572,636 of which the present application is a continuation-in-part application, there is disclosed a method of forming a wire of the aforementioned kind in which the above shortcomings of such wires known in the art are essentially avoided by covering the powder after being introduced into an open channel of substantially U-shaped profile by a sheath which surrounds at least part of the powder and holds it at the bottom of the channel to keep it away from the end edges of the flanks, so that, after the channel is closed by bringing the end edges in abutment with each other, the powder is positively kept away from these end edges, whereby the latter may be welded to each other in a perfect manner and the cross-section of the thus-formed wire may subsequently be reduced by drawing operations or the like to a considerable extent.

However, the process as disclosed in the aforementioned application has still certain drawbacks, especially during reducing of the cross-section of the wire by a drawing or rolling operation since, in this process disclosed in the aforementioned application, the metallic mantle enclosing the core of powder has evidently a non-uniform thickness, in that about half of the circumference of the outer mantle is constituted only by the wall of the channel, whereas the other half is constituted by this wall and the covering sheath, which covers the powder before closing the channel. This non-uniform wall thickness of the outer mantle will cause certain difficulties during subsequent reduction of the cross-section of the wire.

SUMMARY OF THE INVENTION

It is an object of the present invention to provide a welding wire constituted by a core of welding powder enclosed by a mantle of metal and a method of manufacturing the same, which avoids the disadvantages of such methods known in the art and which is also improved over the method as disclosed in the copending application Ser. No. 572,636, especially with regard to the possibility of reducing the cross-section of the originally produced wire to a considerable extent by a drawing or rolling operation.

With these and other objects in view, which will become apparent as the description proceeds, the method according to the present invention of producing a welding wire constituted by a core of welding powder enclosed by a mantle of metal, mainly comprises the steps of forming an elongated upwardly open channel composed of an outer metal channel of substantially U-shaped cross-section having lateral flanks of predetermined height and an inner metal channel of substantially U-shaped cross-section abutting against the inner surface of the outer channel and having lateral flanks of a height about half of the predetermined height of the flanks of the outer channel, introducing into the inner channel a stream of welding powder to fill the inner channel with a loose strand of the powder, covering the loose strand of powder introduced into the inner channel by a metal band having downwardly curved borders engaging the flanks of the inner channel to thereby enclose the powder by said inner channel and the metal band, and closing the outer channel by bringing the upper longitudinal edges thereof in abutment with each other.

The method may also include the step of reducing the cross-section of the thus-produced wire to a considerable extent by passing the originally produced wire through one or a series of subsequent drawing dies or through the nip of cooperating rolls, and in this case the abutting edges of the outer channel are preferably welded to each other.

One characteristic feature of the welding wire according to the present invention resides in the fact that the core of welding powder is enclosed in a double sheath one in contact with the other, in which the inner sheath is constituted by the two bands respectively forming the inner channel and the covering sheet, both extending in the axial direction of the wire and respectively lining corresponding portion of the inner surface of the outer sheath, with the abutting longitudinal edges of the outer sheath extending substantially along a median line of the band of the inner sheath located thereebeneath.

The two bands which form the inner sheath may have the same composition as the band forming the outer channel, and usually they are formed from soft steel. On the other hand, the bands forming the inner sheath may have a composition different from the material forming the outer sheath, for example they may include metallic elements which exercise some action during the welding operation, provided they have a ductility which is not essentially inferior to the material forming the outer sheath. Usually, the bands forming the inner sheaths have a thickness considerably smaller than the band forming the outer sheath.

Since the overlapping edge portions of the inner sheath are covered by the outer sheath and since these overlapping edge portions are usually at least by a quarter of the circumference of the wire distant from the abutting longitudinal edges of the outer sheath, the core of welding powder is perfectly enclosed so that it is not necessary to weld the abutting longitudinal edges of the outer sheath or outer channel to each other. However, if the cross-section of the originally produced wire should subsequently be reduced to a considerable extent, for instance by a drawing operation, to a dimension in the order of a diameter of one millimeter, it is preferred to weld the abutting longitudinal edges of the outer sheath to each other, and such a weld seam may be produced in a perfect manner, due to the fact that the powder of the core is positively kept away from the longitudinal edges of the outer sheath during the welding operation.

Since the inner sheath, which encloses the core of welding powder, presents over its whole circumference a smooth surface engaging the inner surface of the outer sheath, a further reduction of the cross-section of the thus-produced wire to very small diameters by, for instance, a drawing operation can be carried out without any difficulties.

The welding wire according to the present invention, in which the core of powder metal is enclosed by a double sheath, is usually produced with a circular cross-section which may be transformed by further drawing or rolling operations into a wire having a substantially rectangular cross-section. Usually the width of such a wire of rectangular cross-section is at least five times greater than the thickness thereof. Such wires of rectangular cross-section are especially adapted to produce large weld seams during assembly operations or to repair or cover metal pieces by arc welding, with or without a protective gas.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
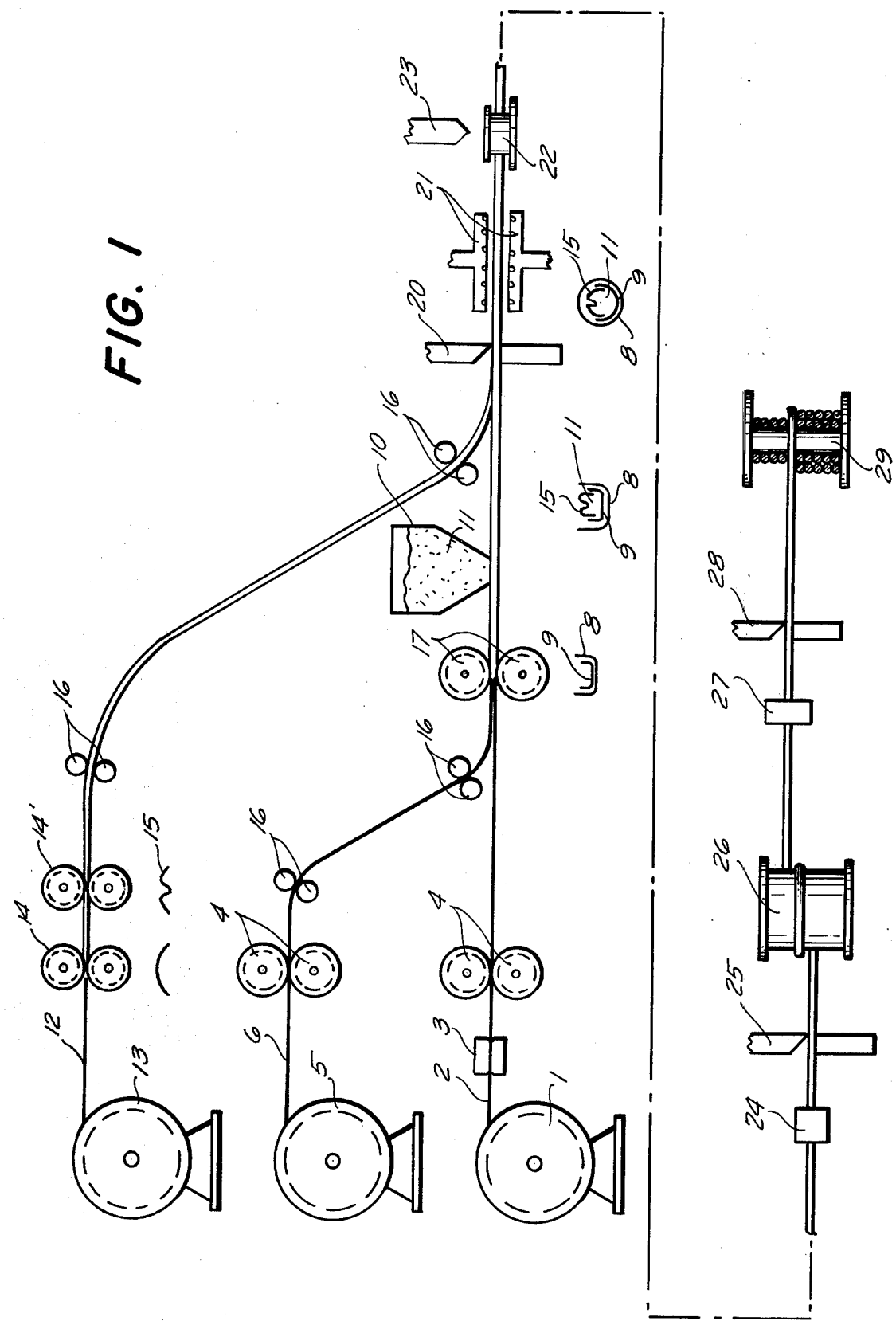
FIG. 1 schematically illustrates an arrangement for manufacturing a welding wire according to the present invention.

As shown in FIG. 1, a metallic strip 2, from which the outer channel of the welding wire is to be formed, is continuously withdrawn from a reel 1 by a pair of cylindrical rolls 4, at least one of which is driven by a motor, not shown in the drawing, and which engage opposite surfaces of the metal strip 2. The band 2, the composition and dimension of which may be varied in accordance with the nature and the diameter of the welding wire to be produced, may for example be a band formed of soft steel with a thickness of 1.2 millimeter and a width of 35.1 millimeter. In order to insure a continuous production, at least one supplementary reel is provided, as well as an automatic installation for welding the end of the metallic band of one reel to the beginning of the metallic band of the supplementary reel. The steel band 2 is passed through a lubricator 3 which may be arranged, as shown in FIG. 1, between the reel 1 and the withdrawal rolls 4, or downstream of the latter, which provides a lubricating film on the band 2 before it is guided into forming means to be subsequently described. Simultaneously with the withdrawal of the ribbon 2 from the reel 1, a second ribbon 6, which may for example also be formed by a band of soft steel of a thickness of 0.3 millimeters and a width smaller than the width of the ribbon 2, is withdrawn from a reel 5 by a pair of cylindrical withdrawing rolls 4, preferably of the same diameter and rotated at the same speed as the rolls 4 which engage the ribbon 2, so that the ribbon 6 is advanced at the same speed as the ribbon 2. The ribbon 6 is guided by means of two pairs of cooperating guide rolls 16 onto the upper surface of the ribbon 2, with the lateral edges of the ribbon 6 of smaller width equally spaced from the lateral edges of the ribbon 2. The two superimposed ribbons 2 and 6 are then guided through forming means constituted by a pair of cooperating profiled rolls 7 by means of which the superimposed flat ribbons or bands 2 and 6 are formed, respectively, into a substantially U-shaped outer channels 8 and a substantially U-shaped inner channel 9, abutting against the inner surface of the outer channel, with the longitudinal edges of the flanks of the inner channel 9 located substantially midway of the flanks of the outer channel 8, as shown in cross-section beneath the rolls 7.

Subsequently thereto, a loose strand of welding powder 11 is discharged into the inner channel 9 to substantially fill the same up to the upper edges thereof. The powder 11, which may include in accordance with the use of the welding wire a mixture of various products of flux-forming material, slag-forming material, oxidizing agents, products emitting a gas, alloying additions, etc. are discharged from a reservoir 10, advantageously equipped with a vibrator or an endless feed screw (not shown), which will assure a continuous flow of the powder out of the longitudinal nozzle of the reservoir 10 and located above the inner channel 9.

Simultaneously with the above-described steps, a flat ribbon or band 12, which may have the same thickness and composition as the band 6, is withdrawn, at the same speed as the bands 2 and 6, from an additional reel 13 and the ribbon 12 is passed between two sets of profiled rolls 14 and 14', having horizontal axes, in which the ribbon 12 is first formed to a cross-section of a circular arc, as shown beneath the set of rolls 14, and subsequently provided with a central longitudinally and inwardly extending groove to produce a cross-section 15, as shown beneath the rolls 14'. This groove is more or less pronounced, in accordance with the depths it should penetrate into the powder. The thus-profiled ribbon 15 is subsequently guided between sets of guide rolls 16, in order to be placed downstream of the reservoir 10 from which the powder is discharged, onto the powder 11 filling the inner channel 9. The profiled ribbon 15 has downwardly curved edge borders, spaced from each other a distance slightly smaller than the distance between the lateral flanks of the inner channel 9, so that the upper portions of the flanks of the inner channel 9 overlap slightly the downwardly curving edge portions of the profiled ribbon 15 to thus completely enclose the strand of powder by the inner channel 9 and the profiled ribbon 15, as shown in cross-section beneath the junction of the profiled band 15 with the channels 8 and 9.

The assembly thus formed is drawn across a special drawing die 20, which is in the form as disclosed in the French application filed with the Ser. No. 741,781 on May 22, 1974, with the title "Drawing Die for Closing a Tube Blank". The drawing die disclosed in the aforementioned application comprises a conical inlet portion, the axis of which includes an angle of 10° to 20° with the horizontal axis of the cylindrical portion integrally joined to the small diameter of the conical portion. This specific drawing die as disclosed in the French application will not only assure abutting of the longitudinal edges of the outer channel 8 against each other, but it will also assure that the tube emanating from the drawing die will not curve in longitudinal direction, but will remain aligned along a horizontal axis. At the outlet end of the drawing die 20, the longitudinal edges of the outer channel 8 will be in contact with each other without overlapping and the powder 11 will be compacted beneath the covering sheet 15, as shown in cross-section beneath and to the right of the die 20.

The thus preformed wire of a diameter in the neighborhood of 12 millimeters is then passed through a burner 21, in which the outer surface of the wire is freed of any remainders of the lubricant used during forming thereof, and the joint is preheated for a following welding operation which thus can be carried out at increased speed. The welding of the abutting longitudinal edges of the outer channel 8 is carried out while the preformed wire is guided between two rollers 22, having vertical axes, which maintain the longitudinal edges of the outer channel 8 in contact with each other and in the desired position. The joining of these edges may be carried out by a welder 23. The latter may be constituted by a resistance welder, by an induction welder, by an arc produced under an inert gas, an electron beam, a laser, or any other welder known in the art, which will carry out the welding operation to obtain a perfect weld seam, which is realizable by the above-described steps according to the present invention. After leaving the welder 23, the wire is then passed through a lubricator 24 and subsequently thereto passed through at least one drawing die 25 in which the diameter of the wire is reduced to be subsequently wound about a winding drum 26, having a vertical axis and being rotated about this axis in clockwise direction by drive means, not shown in the drawing. The welding wire may extend only through one convolution about the winding drum 26 and may be passed from the winding drum 26 through an additional lubricator 27 and through an additional drawing die 28, in which the diameter of the welding wire is further reduced, to be finally wound on a winding drum 29, having likewise a vertical axis and being rotated about this axis by drive means, not shown in the drawing, in the same direction as the drum 26.

The arrangement of winding drums having vertical axes has proven especially advantageous. In fact since the wire extends in horizontal direction, no notable displacement of the powder is produced nor can there be formed a zone without powder or heterogenous zones in which the powder is unequally mixed, contrary what can happen if the drawing is produced by winding drums having horizontal axes. The powder is thus compacted in good condition during reduction of the diameter of the wire to a degree which permits its transport in its final transformation without any risk to the powder core.

Finally, after the diameter of the wire is reduced by cold drawing to the desired diameter, the welding wire may eventually be submitted to different treatments before its use.

Figure 2:
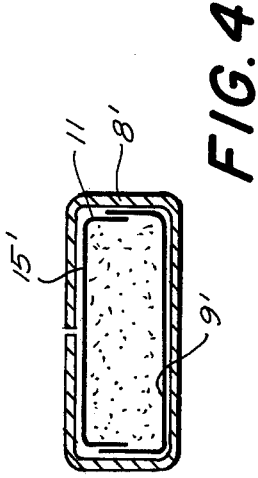
FIG. 2 is a cross-section through a welding wire produced with the arrangement shown in FIG. 1.

The welding wire thus obtained comprises, as shown in the cross-section illustrated in FIG. 2, an inner sheath composed of the inner channel 9 and the covering band 15, completely enclosing the core of powder 11, and in which the flanks of the groove formed in the covering band 15 are brought close to each other in the form of a fold 30, which extends close to the center of the core of powder 11. The inner sheath composed of the elements 9 and 15 is enclosed by the band 2 forming an outer sheath or outer tube about the inner sheath. The outer tube 2 may be covered with a metallic coating 31, for example of a coating of aluminum applied by dipping or by electrolysis. The coating may also be formed of Zu, Zn, Si, Mg. Mn, Ni and different alloys.

The closed tubular wire may be produced at unlimited lengths. The final diameter and the thickness of the outer wall may be determined in advance and may be chosen within a wide range and especially with regard to a very high ratio of the weight of the powder to the weight of the outer metallic tube and with the diameter of a welding wire reduced to 0.6 millimeters.

While in the above-described arrangement the bands 2 and 6 are superimposed in flat condition before being guided between the forming rolls 7, it is also possible to use, instead of the cylindrical withdrawing rolls 4 for each of the bands 2 and 6, profiled forming rolls which respectively form the bands 2 and 6 into substantially U-shaped channels of a configuration as shown beneath the rolls 7 in FIG. 1, to guide the thus-formed inner channel 9, by modified guide rolls into the U-shaped outer channel 8, and to use, instead of the forming rolls 7, appropriately formed rolls which press the outer surface of the preformed inner channel 9 into engagement with the inner surface of the preformed outer channel 8.

It is also possible to eliminate the second set of rolls 14' cooperating with the ribbon 12, if an inward fold 30, as shown in FIG. 2, is not required, especially if the longitudinal edges of the outer channel 8 are not to be welded to each other.

Since the core of powder is completely enclosed by the inner sheath formed by the inner channel 9 and the covering band 15, the welder 23 may also be omitted, so that the longitudinal edges of the outer channel only abut against each other, without being welded to each other. This is especially possible if the cross-section of the wire is subsequently not reduced to a considerable extent by a drawing or rolling operation.

Figure 4:
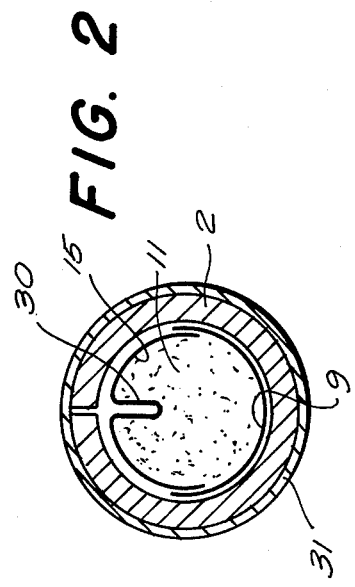
FIG. 4 is a cross-section through a welding wire of rectangular configuration, produced with the modification as shown in FIG. 3.
Figure 3:
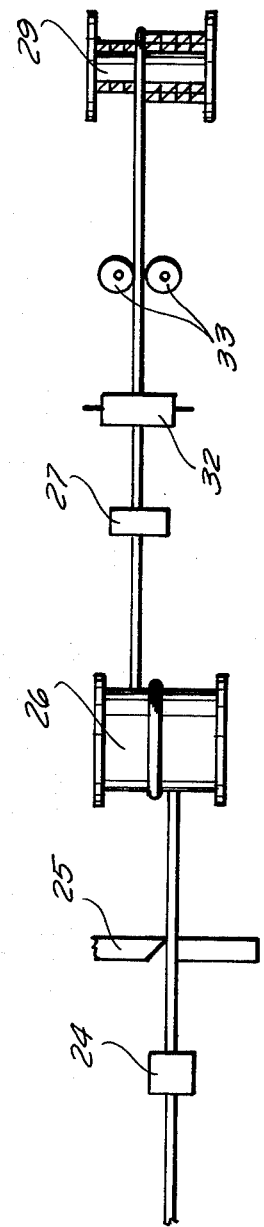
FIG. 3 shows a modified portion of the arrangement shown in FIG. 1, for the production of a welding wire of rectangular cross-section.

FIG. 3 shows part of a slightly modified arrangement for forming the substantially circular welding wire leaving the drawing die 25 into a wire of substantially rectangular configuration as shown in cross-section in FIG. 4. In this modified arrangement, the wire, after passing through the additional lubricator downstream of the winding drum 26, is passed between the nip of a pair of rolls 32 rotating about vertical axes to flatten the wire of circular cross-section, and subsequently through the nip of a pair of rolls 33 rotating about horizontal axes and engaging the side edges of the flattened wire to produce a wire of substantially rectangular cross-section, as shown in FIG. 4. Subsequently, this wire is wound up on the winding drum 29 having a vertical axis.

As shown in FIG. 4, the inner sheath composed of the inner channel 9' and the covering band 15' is of rectangular cross-section and so is the outer channel 8'. The longitudinal edges of the outer channel 8' are shown in FIG. 4 as only abutting against each other and not welded to each other. However, it is to be understood that these longitudinal edges may also be welded to each other, if desired, especially if the cross-section of the welding wire shown in FIG. 4 is considerably smaller than the round cross-section produced by the closing die 20.

The thickness of the wire of substantially rectangular cross-section as shown in FIG. 4 is preferably one-fifth of the width thereof.

It will be understood that each of the elements described above, or two or more together, may also find a useful application in other types of welding wires and methods of manufacturing the same differing from the types described above.

While the invention has been illustrated and described as embodied in a welding wire having a core of powder which is enclosed by a mantle of metal, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

We claim:

1. A welding wire constituted by a core of welding powder enclosed by a mantle of metal, said mantle of metal being formed by an inner metallic sheath and an outer metallic sheath surrounding said inner sheath and having longitudinal edge portions closely adjacent each other, said inner sheath being constituted by two separate bands each lining about half of the inner surface of the outer sheath and each having longitudinal edge portions displaced circumferentially about 90° from the edge portions of the outer sheath.

2. A welding wire as defined in claim 1, wherein the bands forming the inner sheath have a different composition than that of the outer sheath.

3. A welding wire as defined in claim 1, wherein the bands forming said inner sheath have a thickness considerably smaller than that of the outer sheath.

4. A welding wire as defined in claim 1, wherein the longitudinal edge portions of said bands forming said inner sheath slightly overlap each other.

5. A welding wire as defined in claim 1, wherein said welding wire has a substantially circular cross-section.

6. A welding wire as defined in claim 1, wherein said welding wire has a substantially rectangular cross-section.

7. A welding wire as defined in claim 6, wherein said welding wire of rectangular cross-section has a width which is at least five times greater than the thickness thereof.

8. A welding wire as defined in claim 1, wherein the longitudinal edges of the outer sheath are connected by a weld seam to each other.

* * * * *